Dec. 19, 1967   B. E. BRENNAN   3,358,622
SCUM BURNER

Filed Oct. 14, 1965   6 Sheets-Sheet 1

INVENTOR.
BERNARD E. BRENNAN
BY
ATTORNEY

Dec. 19, 1967  B. E. BRENNAN  3,358,622
SCUM BURNER

Filed Oct. 14, 1965  6 Sheets-Sheet 5

INVENTOR.
BERNARD E. BRENNAN
BY
ATTORNEY

United States Patent Office 3,358,622
Patented Dec. 19, 1967

3,358,622
SCUM BURNER
Bernard E. Brennan, Mishawaka, Ind., assignor to Nichols Engineering & Research Corporation, New York, N.Y., a corporation of Delaware
Filed Oct. 14, 1965, Ser. No. 495,871
15 Claims. (Cl. 110—8)

ABSTRACT OF THE DISCLOSURE

A scum burner having a liquid container in which water is maintained at a selected level and to which material to be burned is fed to float on the water, and having an upper combustion chamber with a discharge passage. Jets under pressure discharge primary air into the combustion chamber slightly above the floating scum material and other air supply means of less pressure discharge air into the upper chamber to support complete combustion. Slow speed means moving in the water agitates the scum material to avoid caking thereof with minimum splashing of the water.

---

This invention relates to improvements in scum burners, and more particularly to scum burners for use with sewage treatment equipment.

It is frequently necessary to burn combustible material which is difficult to dispose of by other methods and which is oleaginous in character so that it will separate from water, that is, will rise to the surface of water. The material may be contained in water, as in the case of sewage, or may be fed to a burner by any desired method, as by a screw feed in the case of solids, or by a positive displacement pump. The floatable combustibles may be slow to ignite, and it may be difficult to secure complete combustion by reason of tendency thereof to cake during burning, as in the formation of ash. The disposition of the floatable combustibles is important in the functioning of associated equipment, such as sewage treatment equipment, and prior means of disposing of such materials have had various disadvantages, such as high cost of installation and operation and inefficiency.

It is the primary object of this invention to provide a novel, simple scum burner which will be efficient in operation, will operate at comparatively low cost, and in general will overcome the difficulties previously encountered with the disposition of floatable combustibles by removal from sewage disposal and other systems in which they occur.

A further object is to provide a burner associated with a separator in a liquid flow system so that floatable combustibles can be collected conveniently and disposed of at the point of collection by combustion thereof.

A further object is to provide a device of this character which is constructed to withstand the high temperature of combustion of oleaginous material and which is supplied with a source of primary air and a source of secondary air so discharged therein as to insure complete combustion.

A further object is to provide a device of this character with a stack or discharge passage supplied with a tertiary source of air so as to insure combustion of combustible materials or partly burned materials discharged from the burner to the stack.

Other objects will be apparent from the following specification.

The device has been illustrated in a form thereof suited for use for burning oleaginous floatable materials contained in water passing through a sewage treatment plant. The device has been illustrated in the form of a separator in which floatable material is permitted to rise to the surface of water below a combustion chamber having a stack or discharge passage. Means are provided for supplying air to support combustion at different levels, at different pressures, and at different locations, to facilitate complete combustion of the combustible material accumulated upon the surface of the water. The separator is provided with means to agitate the surface of the water and combustible material thereon so that ash resulting from combustion is broken up and complete combustion of the combustible material is facilitated.

Figure 1:
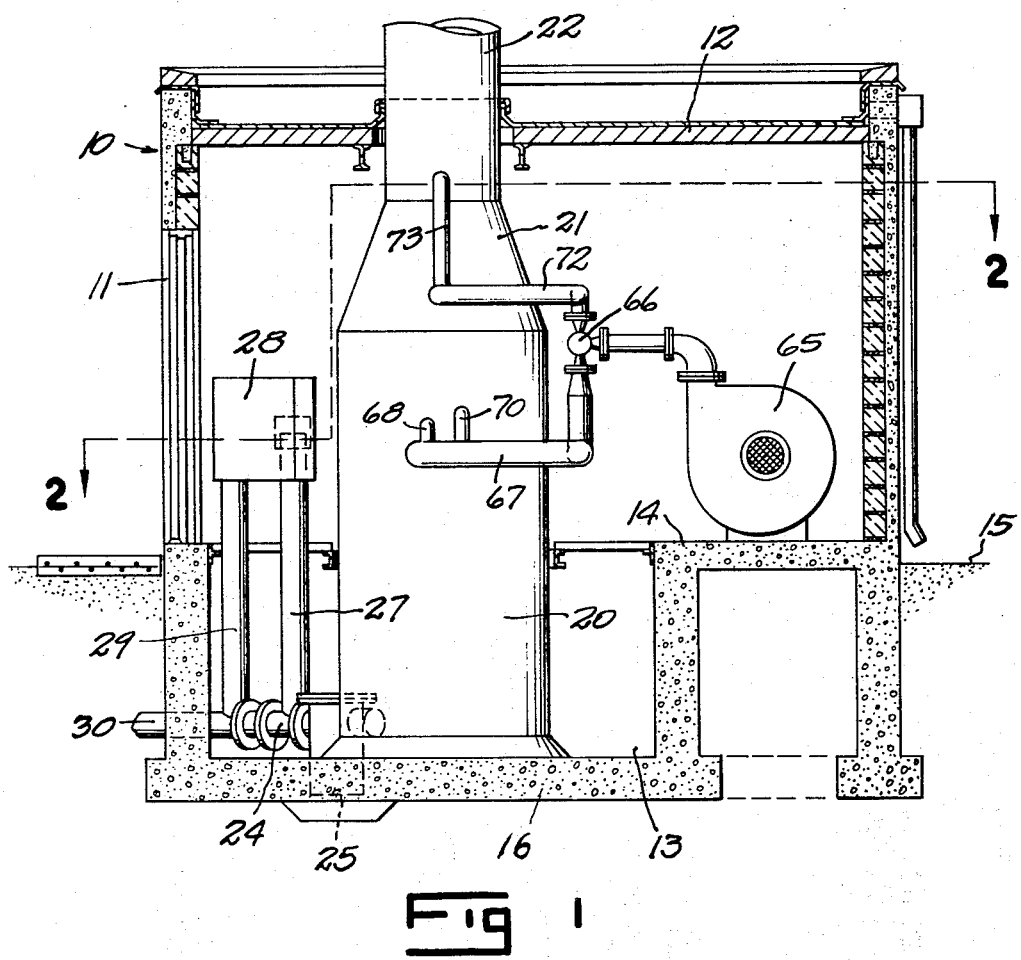
FIG. 1 is a vertical sectional view of the burner taken on line 1—1 of FIG. 2, with parts thereof omitted.
Figure 2:
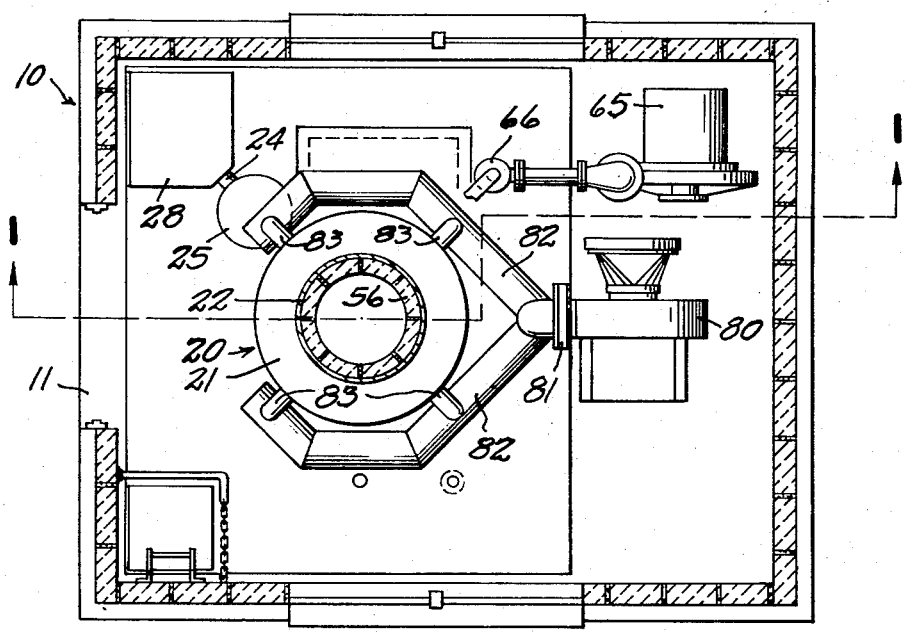
FIG. 2 is a horizontal sectional view taken on line 2—2 of FIG. 1 with parts thereof broken away.
Figure 3:
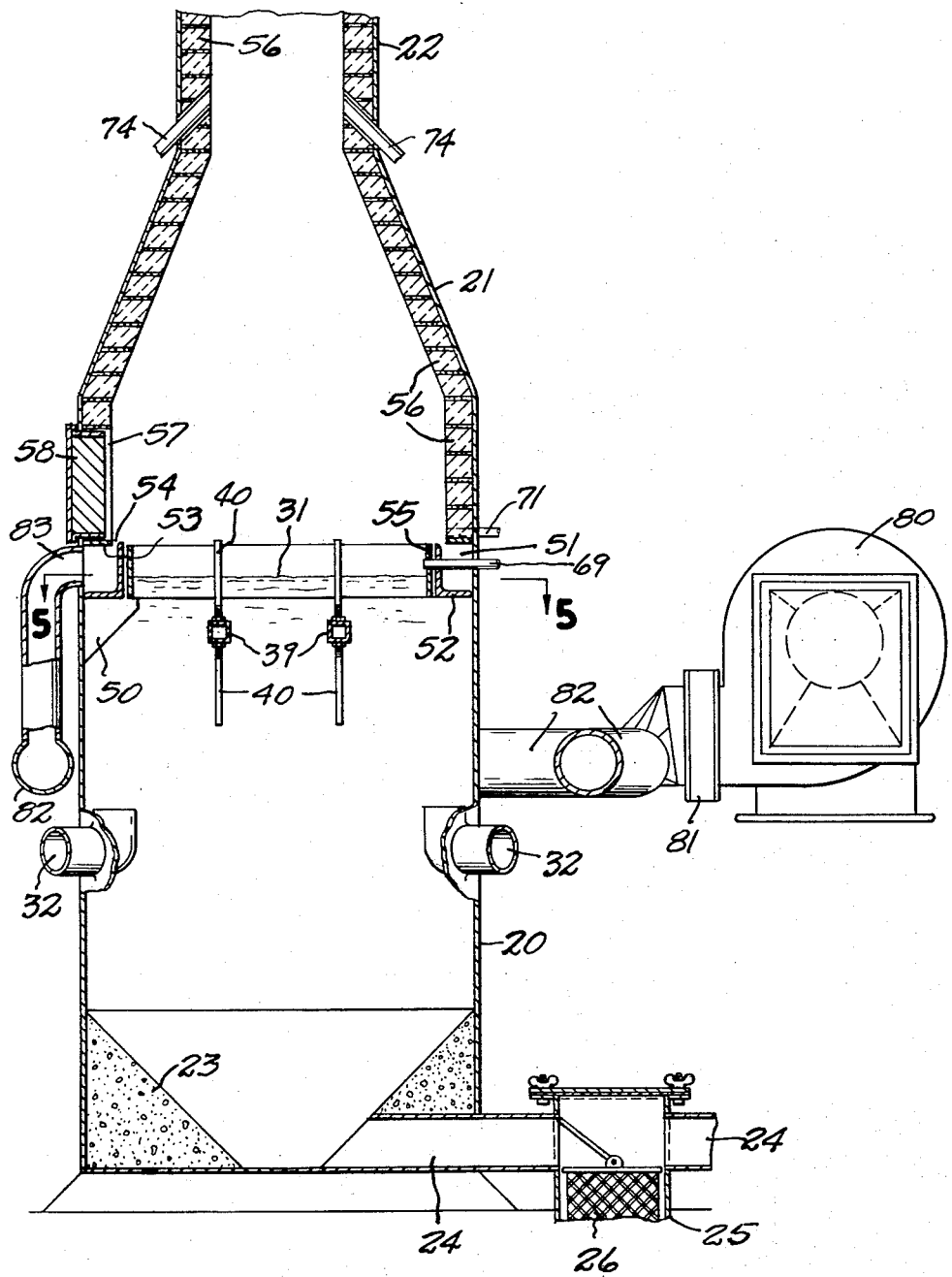
FIG. 3 is an enlarged vertical sectional view of the burner unit taken on line 3—3 of FIG. 5, and illustrating some of the elements associated therewith.

The device is preferably housed in a building or structure 10 having an access door 11, a roof 12, and a pit 13 therein below the floor 14 thereof, the pit preferably being disposed below ground level 15. A tank or container 20, which is preferably vertically elongated, is mounted upon a base, such as the base 16 of the pit 13, in which event it projects above floor level 14, within the building 10. A tapered portion 21 of the tank is positioned at the upper end thereof, and a stack 22 or other means defining a discharge passage for products of combustion projects upwardly from part 21. The tank 20 is preferably formed of metal and preferably has a filler 23 at its bottom defining a frusto conical bottom portion with which communicates an outlet conduit 24 interrupted by a sediment trap 25 in which a reticulated basket 26 is removably mounted. Any suitable liquid level control means may be located in the outlet and, as shown in FIG. 1, such means may include an upwardly extending overflow conduit 27 discharging into an overflow box 28 at selected elevation. A drain tube 29 extends downwardly from box 28 to a discharge conduit 30. The overflow box 28 will preferably be located above the level of the filler 23 and below the level of tapered tank portion 21 and serves to determine the liquid level 31 within the tank 20. One or more inlet conduits 32, preferably below liquid level 31, discharge into the tank 20.

Figure 5:
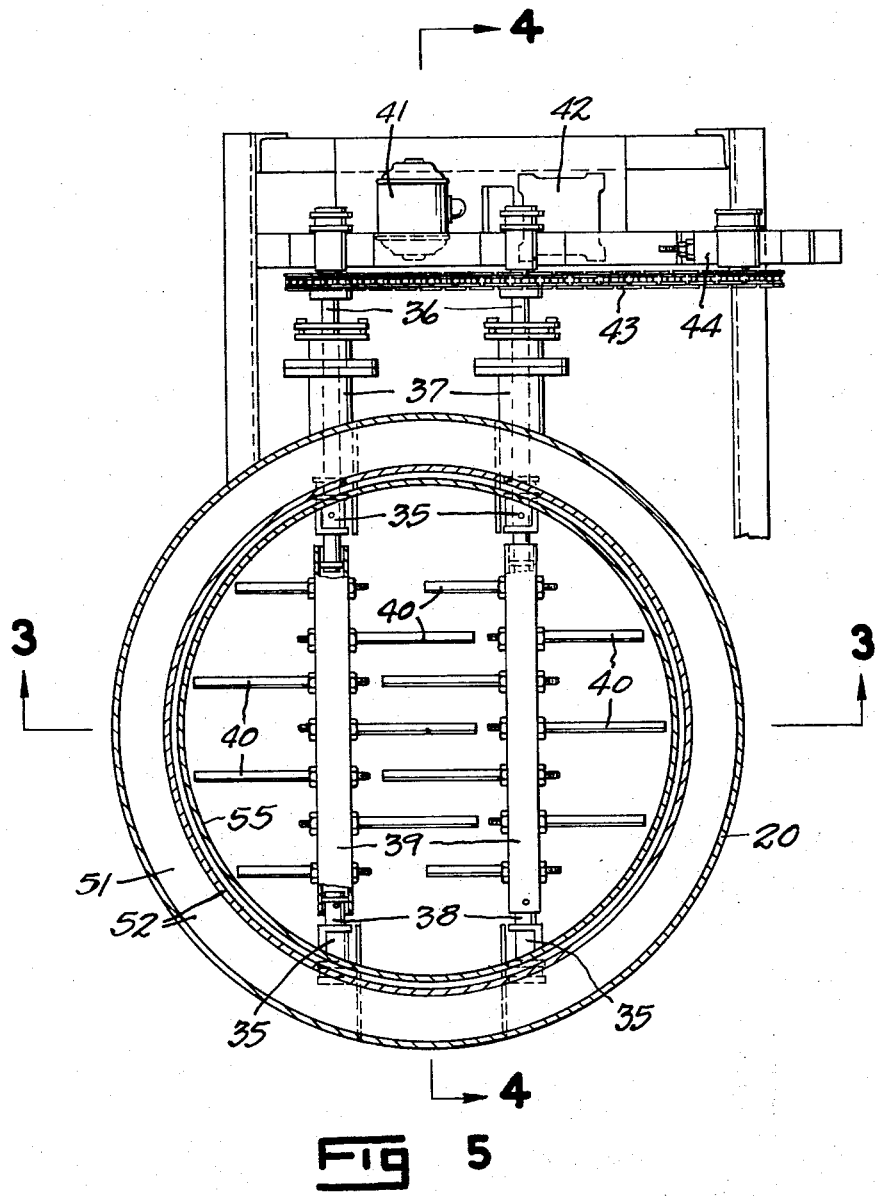
FIG. 5 is a horizontal sectional view of the burner taken on line 5—5 of FIG. 3, with certain elements omitted.

One or more sets of bearings 35 are suitably mounted in the container 20 below the water line or liquid level 31. One or more shafts 36, such as two parallel shafts, each extend through a stuffing box 37 and a bearing 35. A stub shaft 38 is aligned with each shaft 36, being journaled in another bearing 35. A rotor shaft 39 extends between and is mounted upon the inner ends of each set of aligned shafts 36 and 38 and is preferably detachably connected thereto for rotation by shaft 36. Each rotor shaft 39 mounts a plurality of transversely extending fingers 40 which are arranged in interdigital relation with the fingers of the other rotor shaft if multiple rotor shafts 39 are provided, as illustrated in FIG. 5. The fingers 40 are of such lengths that when positioned vertically above the rotor shaft, each will extend above water level 31 to at least a slight extent. The fingers 40 are preferably removably mounted upon the rotor shaft 39, and preferably different fingers on the same shaft extend at different angles therefrom, although the fingers on a given shaft may be parallel if desired. Any suitable means may be provided for driving the shafts 36 and the rotor shafts 39 at low speed, and such means may include a motor 41, a gear reducer 42 and chain and sprocket drive transmission means 43 equipped with slack take-up means 44.

Gusset plates 50 are mounted in the tank 20 slightly below water level 31 and support thereon an annular air chamber 51, here shown as defined by a circular angle iron member 52 welded at its margin to the inner surface of the tank 20 slightly below water level 31 and having a circular upstanding inner wall-defining portion thereof extending above the water level 31. The top of the chamber 51 is defined by an annular plate 53 welded to the tank wall and of a larger inner diameter than the circular part 42 so as to provide an annular discharge passage 54 at the upper inner portion of the air chamber 51. Also supported upon the gusset plates 50 is a steel ring or cylinder 55 which is substantially concentric with and positioned with slight clearance inwardly from the circular air-chamber-defining member 52. Ring 55 is partly below and partly above the water line 31, receives the upper portions of the fingers 40 therein, and serves as the lower tubular portion of a combustion zone, as described hereinafter.

The upper portion of the tank 20 is lined with fire brick 56, which brick also line the tank portion 21 and at least the lower portion of the stack 22. An opening in the upper part of the tank above the water line 31 at 57 provides access to the tank and is normally closed by a door 58 for access to and inspection of the parts of the device adjacent to the water level. The tapered tank portion 21 is preferably provided with an opening 59 for temperature-measuring means (not shown).

Figure 4:
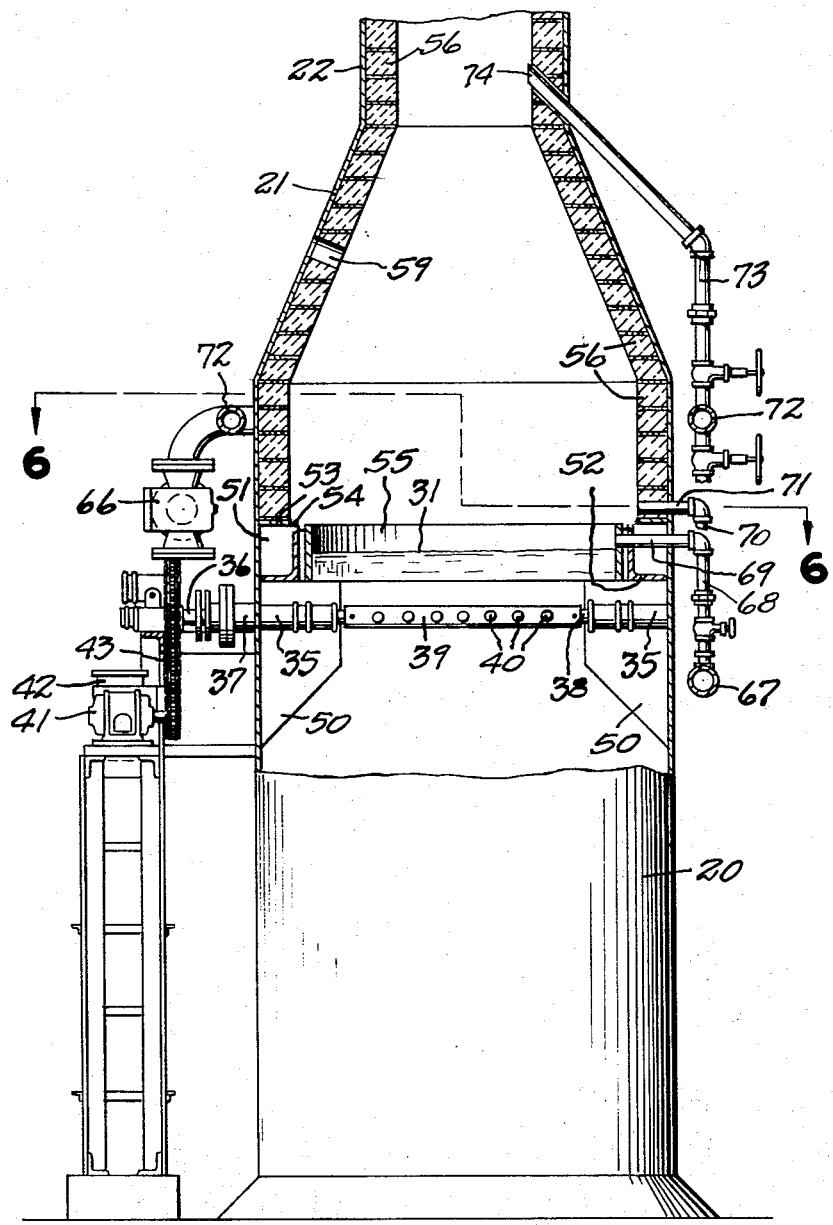
FIG. 4 is a vertical sectional view of the burner taken on line 4—4 of FIG. 5 and illustrating other elements associated therewith.

A primary blower 65 is positioned adjacent the tank 20 and preferably within the building 10. This blower preferably has a three-way valve 66 in its discharge line. Conduits 67 branch from valve 66 and extend partially around the tank 20 at a level preferably below the valve and preferably below the level of the ring 55, as seen in FIGS. 1 and 4, to define a lower header. A plurality of circumferentially spaced branch lines 68 extend from the lower header conduits 67 and communicate with radially positioned jets 69 which are positioned slightly above the water level 31 and extend radially into the tank 20 through the annular air chamber 51 and into and through the inner ring 55 to discharge into the latter. A second set of circumferentially spaced branch lines 70 are in communication with the lower header conduits 67 and in turn communicate with jets 71 extending into the tank or container 20 slightly above the level of the jets 69 and of the ring 55. The jets 71 are preferably arranged at an angle to the radius and are here designated as tangential jets. A second or upper pair of header conduits 72 extend from the valve 66 and are located at a higher level than the lower header conduits 67 and extend partly around the tank 20. Each high level header conduit 72 has one or more upwardly extending conduits 73 projecting therefrom and terminating in a jet 74 extending through the stack 22 adjacent the base thereof.

A secondary blower 80 discharges through a damper 81 to conduits 82 defining a secondary air header extending partly around the container 20. A plurality of conduits 83 branch from the conduits 82 and enter the tank 20 to discharge into the annular air chamber 51.

The operation of the device entails the feeding of material containing buoyant combustibles to the separator container in which they rise in the water therein to the liquid level 31 by reason of the low specific gravity thereof so as to form a scum or layer upon the liquid and within the ring 55. In the case of sewage, the floatable or oleaginous combustibles are carried by the water from the sewer line and enter the container through the inlet conduits 32. A continuous flow of water within the separator tank occurs with discharge therefrom at the outlet conduit 24. The arrangement of the upright overflow conduit 27 and the overflow box 28 insures the maintenance of the desired liquid level 31 within the container 20 despite the continuous flow of material through the separator.

Inasmuch as the floatable combustibles usually constitute only a small proportion of the liquids passing through the separator, the accumulation of combustibles at liquid level is comparatively slow. Thus an interval of time which may run up to twelve or twenty-four hours or longer may be required before the accumulation of a scum layer of any substantial amount upon the liquid in the tank. When this scum layer has accumulated, a quantity of readily combustible material, such as oil, is discharged upon the surface of the scum in the container. Thus, in devices where the surface of the scum is of a diameter of approximately five feet, a quantity of two or three gallons of oil may be poured thereon. This oil is then ignited and raises the temperature in the upper combustion chamber portion of the tank which is lined with fire bricks 56. The oil can be introduced manually by pouring thereof from a container as through the access opening 57 or it may be introduced by other means, not shown, such as a nozzle or jet connected with a supply of oil under pressure.

At or shortly after the time when the starting oil is ignited, the primary blower 65 and secondary blower 80 are energized. The primary blower 65 preferably discharges air at a pressure in the order of three p.s.i. The secondary blower discharges air at a much lower pressure, preferably in a range between two and one-half inches and five inches, as measured in a water flow gauge.

Figure 6:
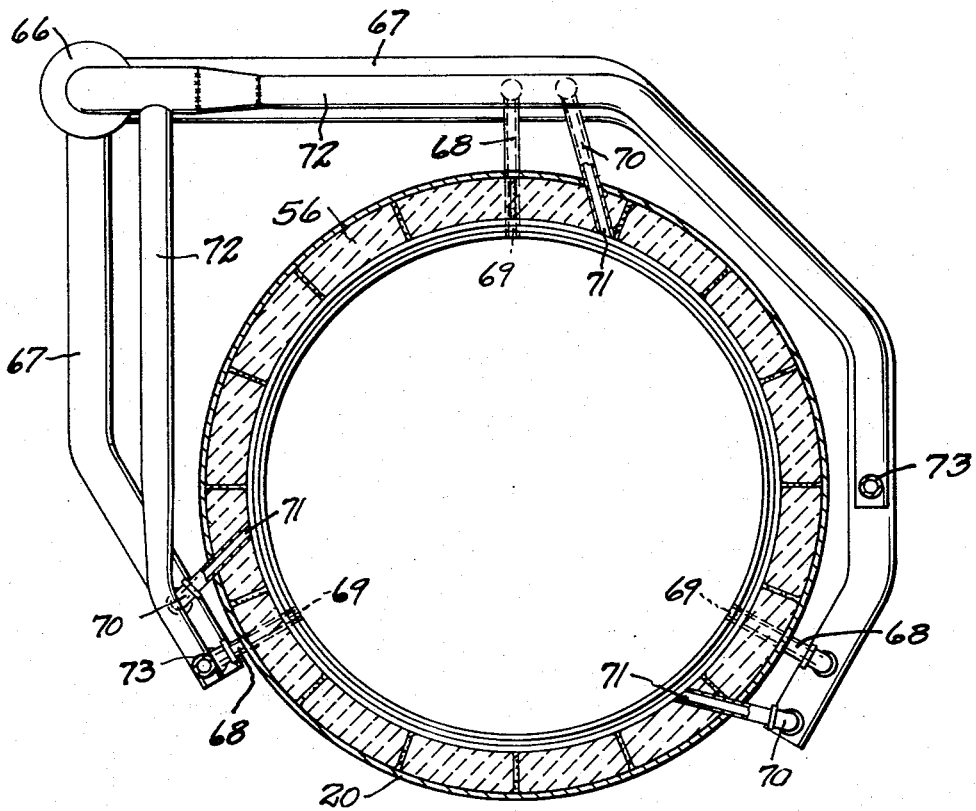
FIG. 6 is a horizontal sectional view taken on line 6—6 of FIG. 4.

The high pressure air discharges at jets 69 at circumferentially spaced points located just above the level of the scum to be burned, as from one to three inches above the water level 31, thus providing primary air to support combustion closely adjacent to the level at which initial combustion of the scum occurs. The tangential jets 71 discharge air at a higher level and in different directions than air discharged at jets 69. In one embodiment found to be effective, the jets 71 are positioned at a level approximately four inches higher than the jets 69 and are displaced therefrom circumferentially and angularly as illustrated in FIG. 6. The air discharged at jets 69 and 71 constitutes the primary source of air to support combustion of the initially supplied ignition oil and of the accumulated scum whose ignition occurs when the ignition oil has generated an ignition temperature in the unit.

A secondary supply of air to support combustion within the upper portion of the chamber, as adjacent to and within the tapered tank portion 21, is supplied from the low pressure blower 80 discharging through the conduits 82 and branch lines 83 for delivery into the annular air chamber 51 within the tank from which it discharges at the annular discharge opening 54. The low pressure air rises in the combustion chamber of the device and is provided in sufficient volume to continue the combustion initiated at the scum surface.

I have found that complete combustion may not occur within the combustion chamber, so that soot or other combustibles may be discharged through the stack 22. The combustion of such combustibles within the stack may be insured by the tertiary air supply through the high level header conduits 72 with which the stack jets are connected. The provision of tertiary air at the base of a stack at one or more points insures completion of combustion and prevents the discharge of smoke and soot from the unit.

Inasmuch as the scum may constitute a thick layer which could be covered by ash after partial ignition thereof, which ash tends to cake so as to prevent complete combustion of the scum, it is necessary to agitate the scum to prevent the caking operation. This is accomplished by driving the rotor shafts 39 so as to rotate the fingers 40 thereof in a manner to pierce the scum and displace it at multiple points. For this purpose slow speed operation only is required, as can be effected through the drive from the motor 41 and the gear reducer 42. The rate of rotation will preferably be quite slow, such as rotation of rotor shafts 39 in the range from one r.p.m. to thirty r.p.m. The agitation will be mild or gentle to minimize splashing of water, but will be sufficient to insure that air will have access to substantially all parts of the scum layer so as to make complete combustion of the scum possible. Combustion can occur during the time that water continues to be fed through the separator and will normally continue until an accumulated layer of scum has been completely burned. It will be understood, of course, that if a high percentage of floatable oleaginous materials to be burned occurs in the liquid which is passed through the separator, the combustion may be continuous, but such conditions are seldom encountered in sewage disposal plants.

It will be understood that valve means and damper means may be provided in the various headers and discharge conduits in the system for controlling the volume of primary air, secondary air and tertiary air supplied to the device. This permits air regulation according to the requirements of the material being burned without interfering with the necessary relation of the volume of the combustion chamber to the surface area of the scum within the ring 55. The latter relationship is required to make possible the initial volatilization of the scum followed by complete burning thereof upon the surface of the water. The mechanical agitation of the scum by the fingers 40 completes the assurance of scum combustion by separating the ash to prevent caking thereof and displacing the scum sufficiently to afford access of air to support combustion.

While the preferred embodiment of the invention has been illustrated and described, it will be understood that changes in the construction may be made within the scope of the appended claims without departing from the spirit of the invention.

I claim:
1. A scum burner comprising
   a container having a lower liquid-containing portion, an upper combustion chamber having a discharge passage for products of combustion,
   means to supply combustible scum-containing material to said lower portion for floatation of said combustible material in a layer on said liquid at a predetermined level in said lower portion,
   means for introducing primary air into said combustion chamber under pressure in at least one jet slightly above the level of said layer of combustible material,
   means for introducing secondary air at less pressure than said jet of primary air into said combustion chamber, and
   means in said container for agitating said layer of combustible material.
2. A scum burner as defined in claim 1, and
   means for introducing tertiary air into the discharge passage adjacent said combustion chamber.
3. A scum burner as defined in claim 1,
   wherein said means for introducing primary air includes a plurality of circumferentially spaced substantially horizontally directed jets.
4. A scum burner as defined in claim 1,
   wherein said means for introducing primary air includes two sets of jets, respectively located at different levels, said lowermost set of jets being substantially horizontally directed.
5. A scum burner as defined in claim 1,
   wherein said means for introducing primary air includes a pair of vertically spaced sets of discharge jets, the jets of one set being substantially horizontal and substantially radially directed and circumferentially spaced at a level slightly above the level of liquid in said container, and the jets of the other set being circumferentially spaced from, above and directed at an angle to the jets of said first set.
6. A scum burner as defined in claim 1,
   wherein said means for introducing secondary air includes an annular outlet into said combustion chamber.
7. A scum burner as defined in claim 1,
   wherein an annular chamber is provided in said container adjacent the liquid level in said lower container part and has connection with a source of secondary air at low pressure and has an annular, inner, upwardly directed discharge into said combustion chamber.
8. A scum burner as defined in claim 1,
   wherein said secondary air introducing means includes an annular chamber adjacent the level of liquid in said container, and
   a combustion confining ring is located within and spaced from said annular chamber.
9. A scum burner as defined in claim 1,
   wherein an annular chamber has an annular outlet discharging said secondary air,
   a combustion confining ring is located within and spaced from said annular chamber, and
   said primary air is discharged through a jet extending through said combustion confining ring and also through a jet located slightly above the level of said combustion confining ring.
10. A scum burner as defined in claim 1,
    wherein said agitating means includes a substantially horizontal rotor located below the level of liquid in said lower container portion and having projections thereon adapted to extend through said layer during a portion of each rotation of said rotor.
11. A scum burner as defined in claim 1,
    wherein said agitating means includes a plurality of substantially parallel horizontal rotors located below the level of liquid in the lower part of said container and each mounting a plurality of fingers extending at an angle to the axis thereof, said fingers being arranged in interdigital relation and being of a length to penetrate said layer when positioned upwardly relative to said rotor.
12. A scum burner as defined in claim 1,
    wherein said agitating means includes a rotor immersed in liquid in said lower container portion and having projections adapted to extend through said layer of combustible material during a portion of each revolution of said rotor, and
    means for rotating said rotor at a speed less than thirty r.p.m.
13. A scum burner as defined in claim 1,
    wherein a combustion confining ring is positioned concentrically in said container with clearance at the level of liquid therein and projects above said liquid level,
    said primary air jet being discharged into said ring.
14. A scum burner as defined in claim 1,
    wherein a combustion confining ring is positioned with clearance in said container and is partially immersed in liquid in said container, and primary air is discharged in a jet into said ring and is discharged in a second jet above the level of said ring.

15. A scum burner as defined in claim 1, wherein a combustion confining ring is positioned with clearance in said container and is partially immersed in liquid in said container, and said agitating means is positioned within the outline of said ring.

References Cited
UNITED STATES PATENTS

| | | | |
|---|---|---|---|
| 159,751 | 2/1875 | Earle | 158—93 |
| 370,883 | 10/1887 | Moore | 158—93 |
| 2,194,980 | 3/1940 | Knapp | 158—91 |
| 2,537,467 | 1/1951 | Komline | 110—8 |
| 2,882,534 | 4/1959 | Jauch et al. | 110—9 |
| 3,034,456 | 4/1962 | Reed | 110—8 |

JAMES W. WESTHAVER, *Primary Examiner.*